United States Patent [19]

Tomita et al.

[11] 4,373,602
[45] Feb. 15, 1983

[54] POWER UNIT SUSPENSION SYSTEM FOR MOTORCYCLES

[75] Inventors: Takao Tomita, Niiza; Hitoshi Yamamoto, Shiki; Shigenaga Enoki, Wako; Isamu Goto, Kiyose; Takeshi Hashimoto, Tachikawa, all of Japan

[73] Assignee: Honda Giken Kogyo Kabushiki Kaisha, Tokyo, Japan

[21] Appl. No.: 240,191

[22] Filed: Mar. 3, 1981

[30] Foreign Application Priority Data

Mar. 6, 1980 [JP] Japan .................. 55-28382
May 30, 1980 [JP] Japan .................. 55-72318
Jun. 2, 1980 [JP] Japan .................. 55-73852
Jun. 2, 1980 [JP] Japan .................. 55-73853

[51] Int. Cl.³ .............................. B62K 11/04
[52] U.S. Cl. ............................. 180/227; 180/228; 248/638
[58] Field of Search ............. 180/223, 227, 228, 218, 180/219, 54 F; 248/638, 658, 634

[56] References Cited

U.S. PATENT DOCUMENTS 2,028,551 1/1936 Lord .......................... 248/7
3,542,146 11/1970 Hooper et al. ............ 180/227
4,324,306 4/1982 Ishihara et al. ........... 180/228

FOREIGN PATENT DOCUMENTS 95493 9/1960 Netherlands ............. 180/228
598754 2/1948 United Kingdom ..... 180/228

Primary Examiner—Joseph F. Peters, Jr.
Assistant Examiner—Michael Mar
Attorney, Agent, or Firm—Irving M. Weiner; Pamela S. Burt; John L. Shortley

[57] ABSTRACT

A power unit suspension system wherein a vehicle frame and a front lower portion of a power unit are connected with each other through a link rotatable about its front and rear pivots. An elastic body is provided between the link and the power unit. Rotational loads due to the power unit weight and rear cushion reaction acting on the link from the power unit side are elastically supported and converted into a moment of rotation.

18 Claims, 17 Drawing Figures

4,373,602

POWER UNIT SUSPENSION SYSTEM FOR MOTORCYCLES

FIELD OF THE INVENTION

The present invention relates generally to a system for swingably suspending and supporting on a vehicle body a power unit formed integrally of an engine and a transmission case containing means for transmitting engine power to a rear wheel.

DESCRIPTION OF RELEVANT ART

There is known a motorcycle of a power unit swinging type wherein a power unit is formed integrally of an engine and a transmission case containing power transmitting means for transmitting engine power to a rear wheel, such as a chain and a rear wheel driving member, and the power unit is vertically swingably fitted and supported on the vehicle body.

In one proposed system for suspending such a power unit on a vehicle body while preventing the vibration thereof from being transmitted to the vehicle body, a vehicle body and a power unit are connected with each other through a link rotatable at its front and rear pivoting parts. The lengthwise direction of the link is set at right angles to the direction of the main vibrating force of the engine and a rubber member is interposed between the link and the vehicle body. With such arrangement, the transmission of vibration from the power unit to the vehicle body due to operation of the engine or the like can be absorbed and damped by the rocking of the link and the movement of the power unit and wheels in response to irregularities of a road surface can be improved. However, because the rubber member is interposed between the link and the vehicle body to support the link and the power unit, the vibration can be transmitted to the vehicle body through the rubber member and the vehicle body cannot be sufficiently protected from vibration.

In order to solve such problem, power unit suspension has been proposed, as shown in the prior art of FIG. 17 of the accompanying drawings.

FIG. 17 is a rear side view of a motorcycle. A power unit 80 formed integrally of an engine 81 and a transmission case 82 is connected to a vehicle body 86 through a link 85 pivotable about front and rear horizontal shafts 83 and 84. The vehicle body 86 and the front part of the power unit 80 are connected with each other through the link 85 which is high in torsional rigidity, and the rear part of the power unit 80 is suspended and supported by a rear cushion unit 87 consisting of a forwardly inclined shock absorber. The position of the engine 80 is suitably arranged so that the suspension system including the power unit 80 has the direction of the main vibrating force of the engine due to reciprocation of a piston set substantially at right angles to the lengthwise direction of the link 85 between the horizontal shafts 83 and 84. The gravity weight G of the power unit 80, the load reaction R acting on a rear wheel axle 88, the cushioning reaction D of the rear cushion unit 87 and the ground surface driving force T acting on the rear wheel 89 are so set that the total sum of moments about the horizontal shaft 84 due to their components $G_2$, $R_2$, $D_2$ and $T_2$ is zero and the remaining components $G_1$, $R_1$, $D_1$ and $T_1$ respectively of the above mentioned vectors G, R, D and T act on the link 85 as a tensile force in total.

Thus, the vectors G, R, D and T do not produce moments as a whole about the horizontal axis 84 but their resultant acts as a tensile force in the lengthwise direction of the link 85. The main vibrating force of the engine is absorbed by the vertical rocking of the link 85 so as to prevent the vibration from being transmitted to the vehicle body 86. However, the rotary moment about the rear wheel axle 88 and the proper frequency thereof with respect to the power unit 80 can produce the following effects. The moment of rotation is produced by the weight G of the power unit 80 and the cushioning reaction D of the rear cushion unit 87 and can be substantially readily determined from the moment of inertia of the power unit 80 about the rear wheel axle 88, the distance between the horizontal shafts 83 and 84 of the link 85, the reaction D of the rear cushion unit 87 and the layout of the vehicle body. As seen from the broken curve A in FIG. 16, representing the vibration frequency characteristic of the suspension system in FIG. 17, the resonance frequency of the suspension system is too high, when considering the main vibration frequency, to effectively prevent the idling vibration of the engine from being transmitted to the vehicle body 86.

This is due to the fact that the link 85 interposed between the vehicle body 86 and the power unit 80 is subjected to a tensile force as the sum of forces acting on the power unit 80. If the link 85 has a longer length in order to attain a desired anti-vibratory effect, the power unit 80 will have to be further displaced rearwardly of the vehicle body 86 by increasing the length of the link 85. However, from the viewpoint of steering safety, the power unit 80 is desirably placed as near as possible to the vehicle body 86 and the length of the link 85 is required to be sufficiently short. Further, since the horizontal shafts 83 and 84 working as pivotal connection parts of the link 85 have their rubber bushes subjected to pressing forces due to the above-mentioned tensile force resulting from the described layout, the rubber bushes thus bear severe compressive forces and can be deemed to have increased spring rates. Therefore, a preferable anti-vibratory effect cannot be expected.

SUMMARY OF THE INVENTION

The present invention overcomes the above-described disadvantages of a system for suspending and supporting a power unit on a vehicle body through a link.

An object of the present invention is to provide a power unit suspension system for motorcycles wherein a link connecting a vehicle with a power unit is not a tension or compression type link subjected to severe lengthwise forces. Rather, a moment of rotation about a rear wheel axle due to all loads, such as the weight of the power unit and the reaction of a rear cushion unit, i.e., a load in the rotating direction about the rear wheel axle, is converted into a moment of rotation about the link, and elastic means capable of opposing the load in the rotating direction are provided for the link so that the power unit is elastically supported by the elastic means in the rotating direction about the rear wheel axle.

Therefore, it is an object of the invention to provide a power unit suspension system for motorcyles wherein a vehicle body and a front lower portion of a power unit are connected with each other through a link pivotable about front and rear horizontal shafts, thereby converting a load in the rotating direction from the power unit into a moment of rotation of the link and elastically supporting the power unit through elastic means. In this manner, the length of the link, which is extremely relevant to anti-vibratory effects of this kind of power unit, can be optionally set, because the link is moved by not only tensile forces but also the moment of rotation, and the elastic means formed of an anti-vibratory material such as rubber provided for the front and rear shafts or pivotal members of the link are substantially reduced in the spring rate, a vibration damping effect due to the length of the link and the anti-vibratory material can be effectively attained. Thus, the transmission of vibration from the power unit to the vehicle body is effectively controlled and prevented and vibration of the vehicle body while the engine is idling is desirably controlled. Further, the power unit can be positioned proximal to the vehicle body, thus rendering the design more advantageous.

Another object of the present invention is to provide a power unit suspension system wherein the elastic means are made of rubber and are preferably disposed as divided and connected with the link therebetween, thereby controlling the transmission of engine vibration to the link and vehicle body by use of the elastic means to thus obtain an improved anti-vibratory effect. The elastic means are divided into upper and lower portions to thereby elastically support the vertical swinging of the power unit, which elastic support can be effective even in the rebound action of the motorcycle, thus attaining a further improved anti-vibratory effect as well as a simplified construction and easier fabrication.

A still further object of the present invention is to provide a power unit suspension system wherein the power unit is suspended from the vehicle body by a single cushion unit and the elastic means of the link are displaced on the transmission case side of a front portion of the power unit to effectively support reaction forces of the elastic means at the side of the transmission case which is most rigid in the power unit, thus reducing influences and burdens on the power unit and the engine caused by the reaction forces due to compression loads or the like borne by the elastic means while further increasing the anti-vibratory effect.

Yet another object of the present invention is to provide a power unit suspension system wherein the link is provided in the form of a protection plate covering a lower portion of the engine at the front side of the power unit and protecting the lower portion of the engine from obstacles, so that the engine can be guarded by utilizing the link without increasing the number of parts.

A further object of the present invention is to provide a power unit suspension system wherein the elastic means, such as rubber, have locking grooves opening sidewardly and upwardly, projecting pieces engaging with the locking grooves are provided on the front lower portion of the power unit, and projecting pieces supporting the elastic means are provided on an upper surface of the link so that the elastic means can be laterally inserted to be mounted at the front lower portion of the power unit, thus simplifying the construction and improving the fitting cooperation.

A still further object of the present invention is to provide a power unit suspension system wherein the link is formed of a box-shaped close-section structure and made of a pressed steel plate, so that the link has a lighter weight and an improved strength and rigidity while the manufacture is also simplified.

Preferred embodiments of the present invention will be explained hereinbelow with reference to the accompanying drawings, and further objects and advantages of the present invention will become clear.

DETAILED DESCRIPTION OF THE INVENTION

Figure 1:
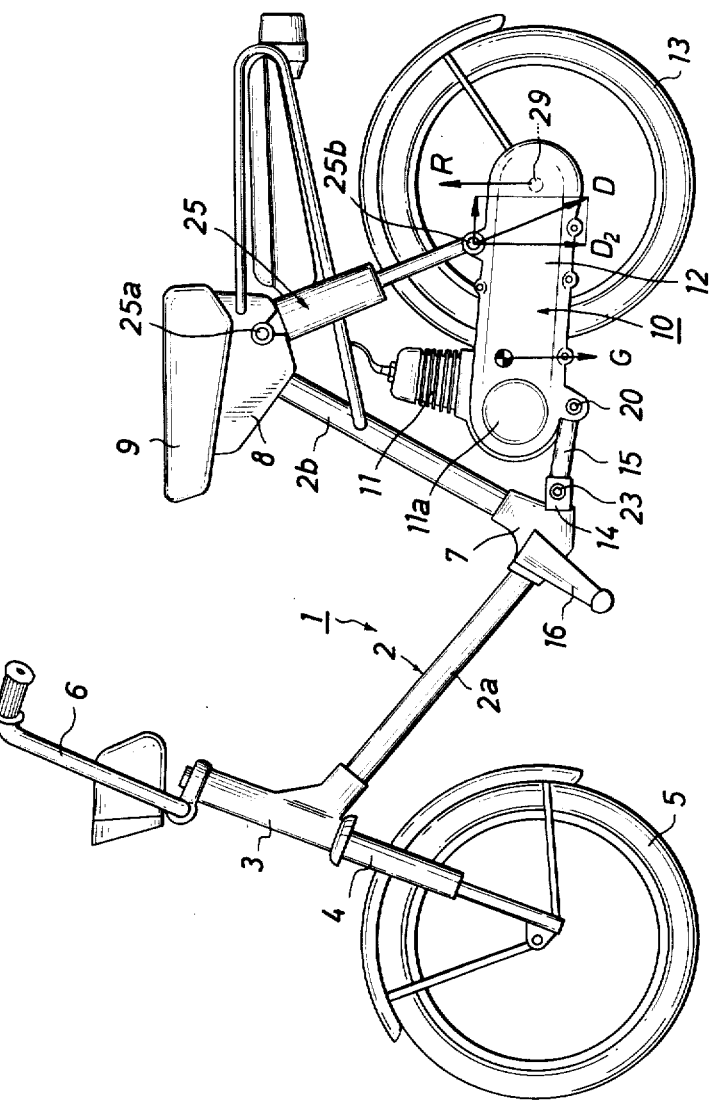
FIG. 1 is a side view of a motocycle.

With reference to FIG. 1, a motorcycle 1 is provided with a head tube 3 in the front of a frame 2, which comprises a V-shaped vehicle body in this embodiment. The frame 2 has the head tube 3 rotatably fitted on a steering stem of a front fork 4 supporting a front wheel 5 and is steered with a handle 6 projecting upwardly from the head tube 3. Further, the frame 2 has its front portion 2a and rear portion 2b which are separate from each other and jointed together at their lower ends by means of a V-shaped joint 7. The rear portion 2b is rearwardly inclined and supports at its upper end a seat 9 through a box member 8.

Figure 2:
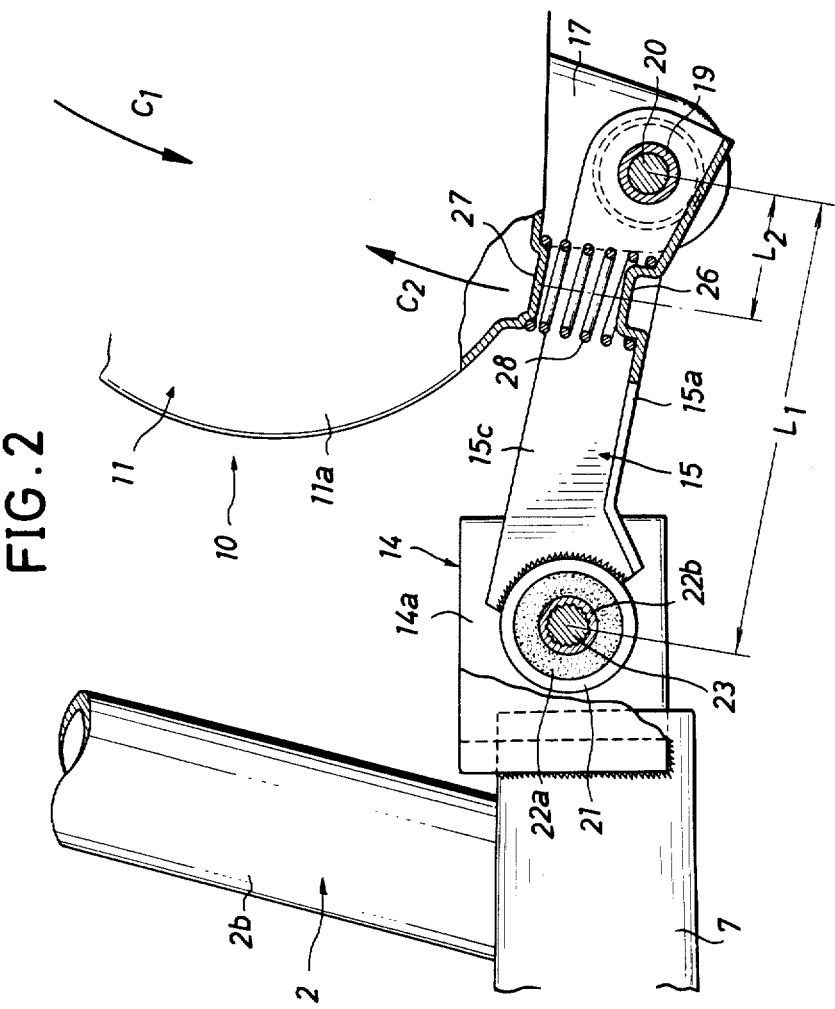
FIG. 2 is a side view of a suspension system according to a first embodiment of the present invention, with an essential portion sectioned.
Figure 3:
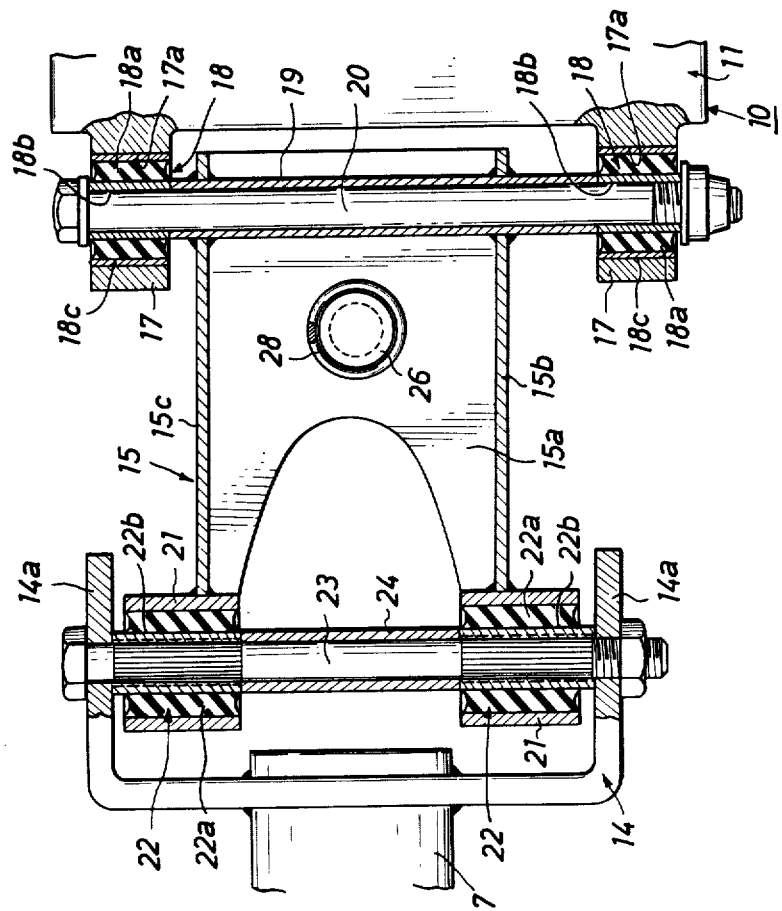
FIG. 3 is a cross-sectional plan view of the suspension system in FIG. 2.

A power unit 10 is formed integrally of an engine 11 and a transmission case 12 containing power transmission means such as a chain transmitting the power of the engine 11 to a rear wheel 13. The power unit 10 is formed by, for example, integrally molding a front portion of the transmission case 12 and a crank case 11a comprising a lower part of the engine 11 and extended on one side of the rear wheel 13, and has its rear portion supporting an axle 29 of the rear wheel 13. As shown in FIGS. 2 and 3, a bracket 14 which is rectangularly U-shaped in a plan view is secured by welding or the like to the joint 7, thus opening rearwardly. The frame 2 and the power unit 10 are connected with each other through a link 15 by using the bracket 14. The bracket 14 may be secured directly to the frame 2 or may be secured to any portion of high rigidity such as a pedal frame 16 (FIG. 1) fixed to the joint 7.

The link 15 is formed, for example, by bending both right and left side plates 15c and 15b from a bottom plate 15a, and has a high torsional rigidity. A pair of downwardly extending right and left projections or bosses 17 and 17 are provided at a front lower portion of the transmission case 12 or the crank case 11a as the lower part of the engine 11. For each of the projections 17, a rubber bush 18 comprising a rubber portion 18a fitted integrally by baking between an inner ring 18b and an outer ring 18c is inserted through and fitted in a hole 17a provided through the projection 17. A spacer collar 19, horizontally fixed by the rear end of the link 15, is placed between the projections 17 and 17. A horizontal shaft 20 in the form of a bolt is provided through both inner rings 18b and 18b of the right and left rubber bushes 18 and 18 and the spacer collar 19, thus pivotally connecting the rear part of the link 15 to the front lower portion of the power unit 10.

The link 15 has its front end separated into two distal ends and a pair of right and left cylindrical members 21 and 21 are horizontally fixed at either distal end of the link 15. Each of the members 21 has an inner ring 22b provided therethrough and a rubber portion 22a is fitted between and integrally baked to the inside of each cylindrical member 21 and the outside of each corresponding inner ring 22b. A horizontal shaft 23 in the form of a bolt is provided across right and left side bent portions 14a and 14a of the bracket 14 and through both of the inner rings 22b and 22b and a spacer collar 24 is interposed between these inner rings 22b and 22b, thus pivotally connecting the front end of the link 15 to the frame 2 at each of the distal ends thereof with a cylindrical rubber bush 22 each comprising the inner ring 22b and the rubber portion 22a.

The vehicle frame 2 and the front lower portion of the power unit 10 are thus connected with each other through the link 15 which is pivotal at its front and rear ends with respect to the front and rear horizontal shafts 23 and 20. The power unit 10 has its front portion extended over a rear portion of the link 15. In order to prevent the relative rotary motion between the inner ring 22b of the front rubber bush 22 and the front horizontal shaft 23, as shown in FIGS. 2 and 3, the inner ring 22b and the shaft 23 may be spline-engaged with each other so that, when a moment of rotation about the horizontal shaft 23 acts on the link 15, the moment can be elastically borne by the rubber portion 22a which is compressed and deformed in its circumferential direction.

As shown in FIG. 1, a rear cushion or shock absorbing unit 25 is mounted between an upper portion of the frame 2, such as the box member 8 having the seat 9 fitted on its upper side, and a rear portion of the power unit 10, and is forwardly inclined. This unit 25 is rotatably connected at its upper and lower pivotal ends 25a and 25b respectively to the frame 2 and the power unit 10 with respective rubber members (not shown) provided therebetween so as to prevent the vibration of the power unit 10 from being transmitted to the vehicle frame 2 through the rear cushion unit 25. The rear cushion unit 25 is provided only on the power unit 10 side of the rear wheel 13 and is of a cantilever-support type.

As shown in FIGS. 2 and 3, an upwardly projecting lower spring seat 26 is provided on the bottom plate 15a of the link 15 and an upper spring seat 27 is provided on the front lower portion of power unit 10. A resilient means such as a coil spring 28 is interposed between these upper and lower spring seats 27 and 26, and is thus compressively fitted between an upwardly facing portion of the link 15 and the front lower portion of the power unit 10 so as to resiliently support the front portion of the power unit 10 with the resilient reaction of the coil spring 28.

In the above, the engine 11 is displaced such that the lengthwise direction of the link 15 and the direction of the main vibrating force of the engine 11 are substantially at right angles with each other, with the direction of such force being substantially vertical.

The loads acting on the power unit 10 include the weight G of the power unit, load reaction R of the rear wheel axle 29, and cushioning reaction of the rear cushion 25, thus resulting in a moment $C_1$ of counterclockwise rotation of the power unit 10 about the rear wheel axle 29 due to the weight G of the power unit 10 and a vertical component $D_2$ of the cushioning reaction D of the rear cushion unit 25.

Because the rear end of the link 15 is rotatably connected to the front lower portion of the power unit 10, the moment $C_1$ of counterclockwise rotation of the power unit 10 is converted into a moment of rotation about the horizontal shaft 23 at the front end of the link 15 and therefore the link 15 pivotally and resiliently supports the moment $C_1$. More specifically, the moment $C_1$ is preferably borne by the compressive deformation of the rubber portion 22a in the circumferential direction thereof. At the same time, the resultant load $C_1$ in the counterclockwise direction of the power unit 10 due to the power unit weight G, the cushioning reaction D, and additional loads of members causing a moment of rotation about the rear wheel axle 29 if such are attached to the power unit 10, is borne by a resilient reaction $C_2$ of the coil spring 28 between the link 15 and power unit 10 as well as by a reaction at the horizontal shaft 20. Therefore, the load $C_1$ is also resiliently and effectively supported at the rear end of the link 15.

Figure 16:
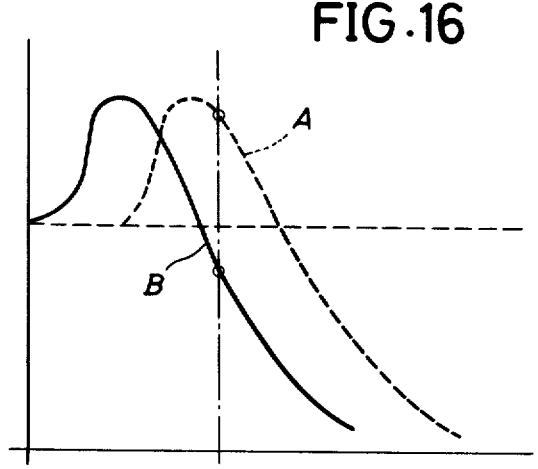
FIG. 16 is a graph including a continuous curve and a broken curve representing vibration frequency characteristics of a suspension system according to the present invention and a conventional suspension system, respectively.
Figure 17:
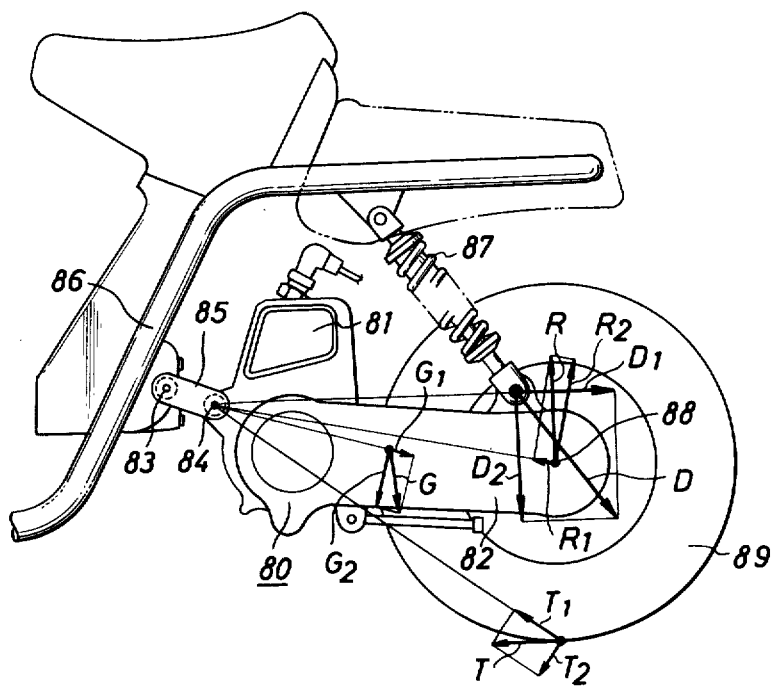
FIG. 17 is a side view of a motorcycle including the conventional suspension system as represented in FIG. 16.

The main vibrating force due to the drive of the engine 11 is thus absorbed by the substantially vertical rocking of the link 15 having its lengthwise direction substantially at right angles to the direction of the main vibrating force of the engine 11. In addition, because such main vibrating direction substantially coincides with the yielding and contracting direction of the coil spring 28 which is arranged on the lower of the crank case 11a generating the main vibrating force the main vibrating force can be effectively absorbed by the resilient deformation of the spring 28. Further, the vibration due to the idling of the engine 11 is effectively prevented by the rubber bushes 18 and 22, which are elastically disposed laterally and at right angles to the pivotal motions of the link 15, from being transmitted to the frame 2. As a result, as shown by the continuous line curve B representing this embodiment in the graph of FIG. 16, the resonance point with respect to the vibration frequency may be lowered or shifted leftwardly in the graph, thus being substantially displaced from the broken line curve A representing the conventional example.

The effect of controlling the transmission of the vibration from the power unit 10 to the vehicle body frame 2 depends on the spring rate of the coil spring 28. This spring rate is selective in design by varying the ratio of a distance $I_1$ between the horizontal shafts 23 and 20 to a distance $L_2$ between the spring 28 and the horizontal shaft 20, because the horizontal shaft 20 is provided on the lower side of the power unit 10 so as to thus have a variable position in the longitudinal direction of the power unit 10. Therefore, by properly selecting the spring rate of the coil spring 28, the transmission of the vibration to the frame 2 can be effectively prevented even at a lower vibration frequency or in the idling state of the engine 11.

Further, because the link 15 converts the load $C_1$ in the rotating direction about the rear wheel axle 29 on the power unit to the moments of rotation about the 20 rubber portions 18a and 22a at both ends of the link 15, thus effecting a substantial reduction in the apparent spring rate as a whole, the transmission of the vibration from the power unit 10 to the frame 2 can be effectively damped.

Further, because it is at the lower side of the front portion of the frame 2 that the power unit 10 is connected to the body frame 2 through the link 15, the position of the power unit 10 relative to the vehicle frame 2 can be freely set without substantial restriction as to the length of the link 15 which provides a considerable anti-vibratory effect. It is thus possible to have the power unit 10 approach the vehicle body 2 and a diserable arrangement of the power unit 10 can be realized.

Figure 15:
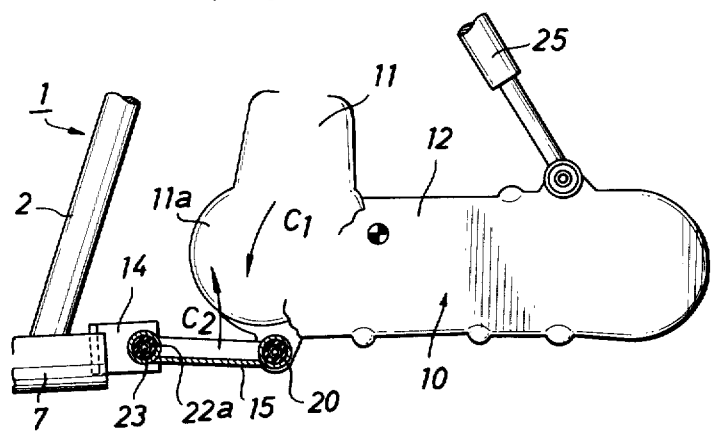
FIG. 15 is a side view of a suspension system according to a fifth embodiment of the invention.

In the above embodiment, the coil spring 28 is interposed between the link 15 and power unit 10 in order to obtain the reaction $C_2$ opposing the load $C_1$ in the rotating direction about the rear wheel axle 29 due to the weight G of the power unit 10 and the cushioning reaction D of the rear cushion 25. A modified embodiment for obtaining such reaction is shown in FIG. 15.

In this embodiment, a preset pressure load is attained by prior twisting and deformation of the peripheral portion of rubber portion 22a provided for connecting the vehicle body 2 with the front end of the link 15 through the horizontal shaft 23, and a moment of rotation tending to rotate the link 15 upwardly about the horizontal shaft 23 is generated by the preset load. When the load $C_1$ in the rotating direction acts on the link 15, a reaction $C_2$ opposing the load $C_1$ will be effectively provided in the form of a moment of rotation about the horizontal shaft 23, due to inherent elastic forces of the rubber portion 22a, as which are suitably increased by the preloaded torsional forces.

FIGS. 4 to 7 show a second embodiment of the present invention.

Figure 4:
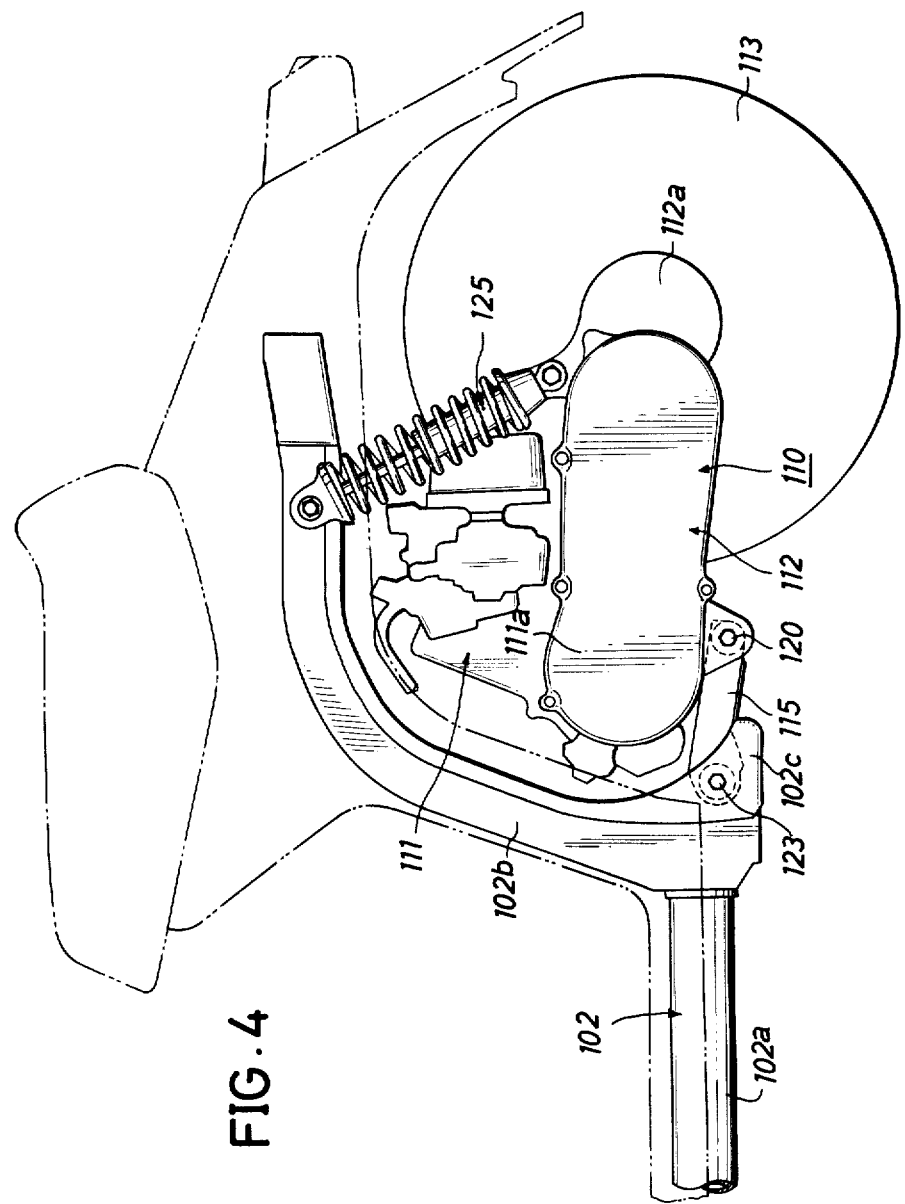
FIG. 4 is a side view of a rear portion of a motorcycle according to a second embodiment of the invention.
Figure 7:
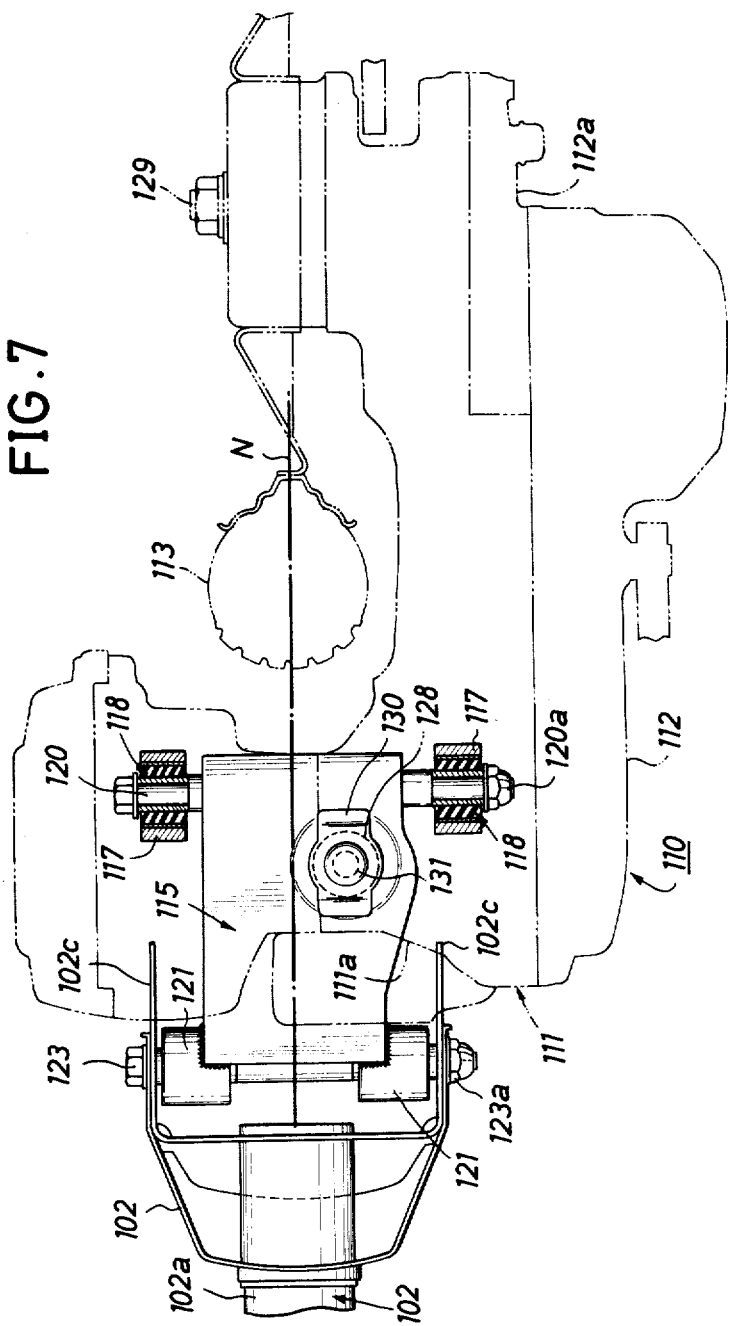
FIG. 7 is a plan view of the rear portion of the motorcycle in FIG. 4, with an essential portion sectioned.

FIG. 4 is a side view of a rear vehicle portion of a motorcycle according to the invention. A frame 102 forming a vehicle body has the rear portion 102b thereof extended upwardly and rearwardly from the rear end of a front portion 102a of the frame 102 extending at a low level in the longitudinal direction. As shown in FIG. 7, in a power unit 110 integrally composed of an engine 111 and a transmission case 112, a crank case 111a comprising a lower portion of the engine 111 disposed in a front portion of the unit 110 is adapted to laterally extend in front of a rear wheel 113.

The transmission case 112 has its rear portion 112a extended rearwardly passing by one side of the rear wheel 113, that is, the transmission case 112 is provided only on one side of the rear wheel 113 and this rear wheel 113 is supported by a rear axle 129 projecting inwardly from the rear portion 112a. A lower surface of the front portion of the power unit 110 and the frame 102 are connected with each other through a link 115. A rear cushion unit 125 is mounted between the rear portion 112a of the transmission case 112 of the power unit 110 and the rear portion 102b of the frame 102, and is singularly provided between the case 112 disposed on one side of the rear wheel 113 and the frame 102 in the form of a cantilever support with respect to the rear frame portion 102b.

Figure 5:
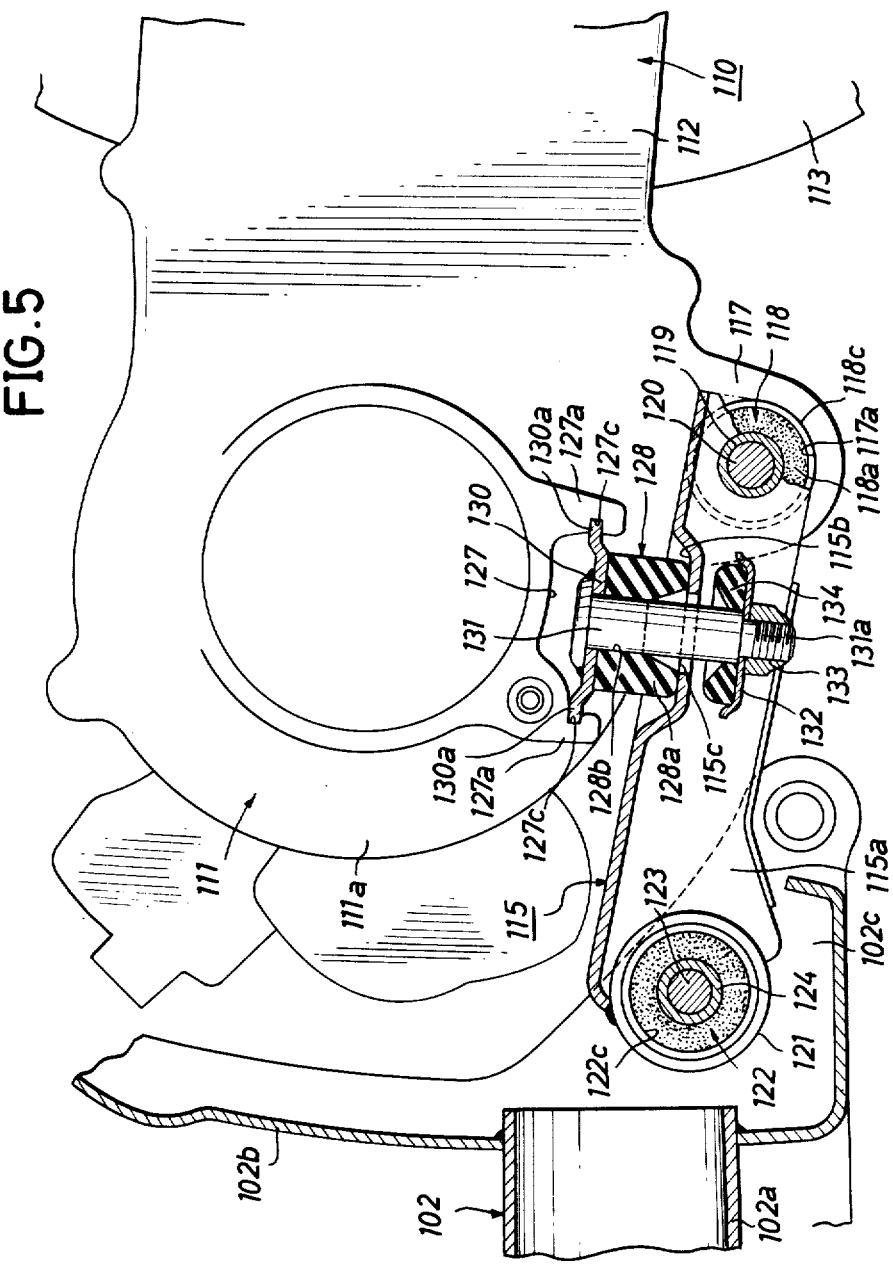
FIG. 5 is a side view of the suspension system in FIG. 4, with an essential portion sectioned.
Figure 6:
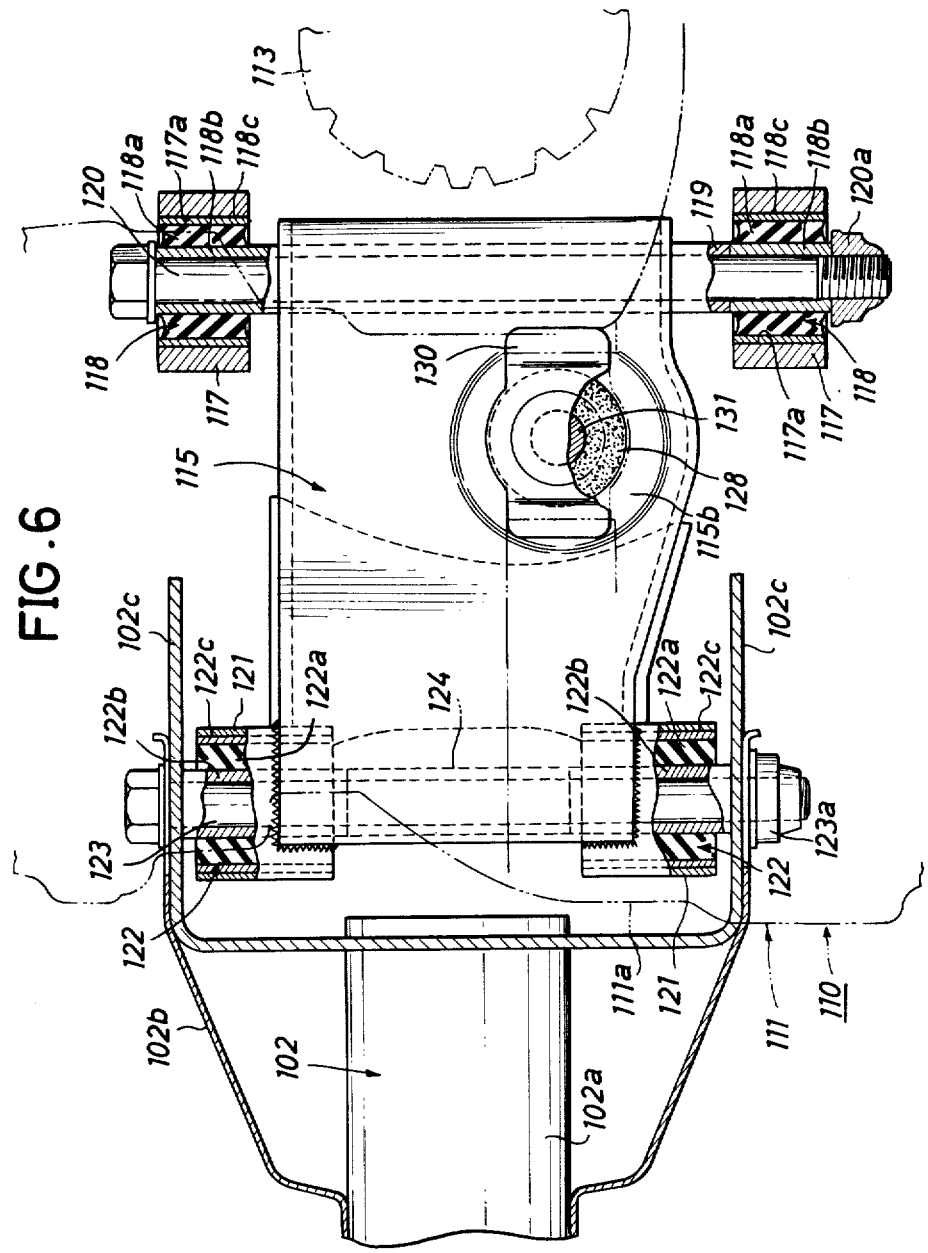
FIG. 6 is a plan view of the suspension system in FIG. 5, with an essential portion sectioned.

Details of the link 115 are shown in FIGS. 5 and 6. The link 115 is made of a press-molded steel plate material substantially in the form of a square which is flat and longitudinally long, and has both side plates 115a and 115a thereof bent downwardly to obtain a high torsional rigidity. Two supporting projections 117 and 117 having holes 117a extending in the width direction of the crank case 111a are downwardly provided on either lateral side of the lower surface of the crank case 111a. Each of the two lateral holes 117a has a rubber portion bush 118 fitted therein including a rubber 118a with its inside and outside diameter portions respectively baked onto inner and outer rings 118b and 118c. On the other hand, a collar 119 of the same diameter as the inner ring 118b is provided between respective rear parts of both side plates 115a and 115a of the link 115, and a bolt 120 forming a rear horizontal shaft is laterally passed through the two inner rings 118b and 118b via the collar 119 placed therebetween and is fastened with a nut 120a from outside of either projection 117. Thus, as described hereinabove, the front lower portion of the power unit 110 is pivotally connected to the rear end of the link 115 through elastic means such as the rubber bushes 118.

Further, two cylindrical members 121 and 121 are secured to either front part of the two side plates 115a of the link 115. A rubber bush 122 including a rubber portion 122a baked onto inner and outer rings 122b and 122c is pressed into the inside diameter portion of each cylindrical member 121, and a collar 124 is interposed between the inner rings 122b and 122b. The link 115 has its front part located between both side pieces 102c and 102c of a lower part of the rear portion 102b of the frame 102, and a bolt forming a front horizontal shaft 123 is passed through the inner ring 122b of either rubber bush 122, the collar 124 and the inner ring 122b of the other rubber bush 122 from the outside of either side piece 102c to the outside of the other side piece 102c and fastened with a nut 123a. Thus, the front part of the link 115 is pivotally connected to the vehicle frame 102. Here, the moment of rotation about the shaft 123 is transmitted to both rubber bushes 122 through respective members 121 while each bush 122 is restricted against rotation at its inner diameter portion by the inner ring 122b. Each front rubber bush 122 pressed into the cylindrical member 121 has the inner ring 122b suitably secured to the shaft 123 by means of a spline or the like so that, when a clockwise torque about the front shaft 123 of the link 115 in FIG. 5 is developed, the rubber portion 122a elastically deforms tangentially to thus bear the torque. A preload in the direction opposing this torque, that is, in the counterclockwise direction, may be given to the bush 122 in advance. The link 115 is preferably arranged so that its longitudinal direction is substantially at right angles to the direction of the main vibrating force of the engine 111.

An elastic means 128 such as a rubber member is further interposed between an intermediate part of the link 115 and a front lower portion of the power unit 110 located above it.

As shown in FIGS. 5 and 6, the rubber member 128 is cylindrical, its lower portion 128a has the inside diameter thereof reduced in thickness so as to be easily deformed, its top surface has a supporting plate 130 placed thereupon, and a stay 131 secured to and vertically provided through the supporting plate 130 is passed through the inside diameter part 128b and loosely suspended through a hole 115c which is formed in a recess 115b provided in the intermediate part of the link 115. Another supporting plate 132 is secured on the lower side of the stay 131 by applying a nut 133 or the like on the lower distal end 131a of the stay which may be threaded, and has a rubber bump stopper member 134 provided thereon with its upper surface normally spaced apart from the lower surface of the recess 115b of the link 115, the rubber member 134 surrounding the periphery of a lower portion of the stay 131. On the side of the power unit 110, the rubber member 128 is secured by forming a lateral recess 127, which is open downwardly, in a lower surface of the crank case 111a and laterally providing front and rear grooves 127c and 127c in respective inner walls of front and rear parts 127a and 127a of the recess 127. The upper supporting plate 130 of the rubber member 128 has its front and rear edges 130a and 130a respectively fitted to be engaged into the front and rear grooves 127c and 127c from the side.

Thus, as described hereinabove, the front portion of the power unit 110 located above the link 115 is elastically and effectively supported with both the rubber bushes 122 and the rubber member 128 between the link 115 and the front lower portion of the power unit 110. Because the main vibrating force of the engine 111 acting in the axial direction of the rubber member 128 is effectively absorbed by the elastic yielding action of the rubber member 128, the transmission of the vibration to the link 115 and vehicle frame 102 is controlled to the greatest extent possible and even the vibration or the like during idling of the engine 111 is effectively absorbed by the rubber member 128.

Moreover, the upward motion of the front portion of the power unit 110 with respect to the link 115 is also reduced and absorbed by the abutment of the lower rubber member 134 against the lower surface of the link 115. In other words, the rubber member 134 functions as a rebound cushioning stopper. The motion in the vertical direction of the front portion of the power unit 110 is thus effectively reduced and absorbed by a compressed deformation of either the upper or lower rubber member 128 and 134. The rebound-cushioning member 134 on which the load of the power unit 110 does not directly act is made small in capacity.

Further, the rubber member 128 which is an elastic means to be compressed and deformed by the load acting downwardly on the lower side of the engine 111 in the front portion of the power unit 110 has its reaction forces developed on the lower side of the engine 111 in the direction reverse to the direction of the main vibrating force. In case this reaction by the rubber member 128 is received on the vehicle body axis N (shown in FIG. 7) on the lower side of the engine 111, the entire power unit 110 including the transmission case 112 will be displaced to one side of the vehicle body axis N and, because the rear cushion unit 125 is of a cantilever-support type and further the wheel 113 is supported on one side of the transmission case, a twisting force will act on the power unit 110 and the rigidity of the entire power unit 110 and crank case 111a must be increased by more than a reasonable amount. Therefore, as in the illustrated embodiment, the position of the rubber member 128 is on the side of axis N toward the transmission case 112, thus gaining a suitable access to the axis of the transmission case in a space between the upper surface of the link 115 and the lower side of the engine 111. In other words, as shown in FIG. 7, the rubber member 128 is displaced to the left side of the vehicle body axis. Thereby, the reaction of the rubber member 128 can be received at a position where the reaction load is bearable without undue increase in the rigidity of the engine 111, the crank case 111a and the transmission case 112 of the power unit 110, thus making it possible to obtain a superior anti-vibratory effect with a simple and light power unit structure having a reasonably minimized rigidity and strength.

The link 115 is provided in the form of a flat plate with a substantial width or a box which is flat to have a substantial area, so that the lower surface of the crank case 111a of the engine 111 of the power unit 110 is opposed to the upper surface of the intermediate part and rear part of the link 115. Therefore, the link 115 also functions as a protecting plate for the lower side of the engine 111. When obstacles hit from below the link, the lower surface of the engine 111 is shielded therefrom, i.e., the lower surface of the engine 111 is protected from such obstacles. Because the rubber member 128 is interposed between the link 115 and the lower surface of the engine 111, any shock to be transmitted from the link 115 to the engine 111 passes through the rubber member 128, thus being reduced.

The above embodiment has been described in detail with reference to FIGS. 4 to 7. For the elastic means 128 and 134, coil springs may be used instead of the rubber members described above.

Figure 8:
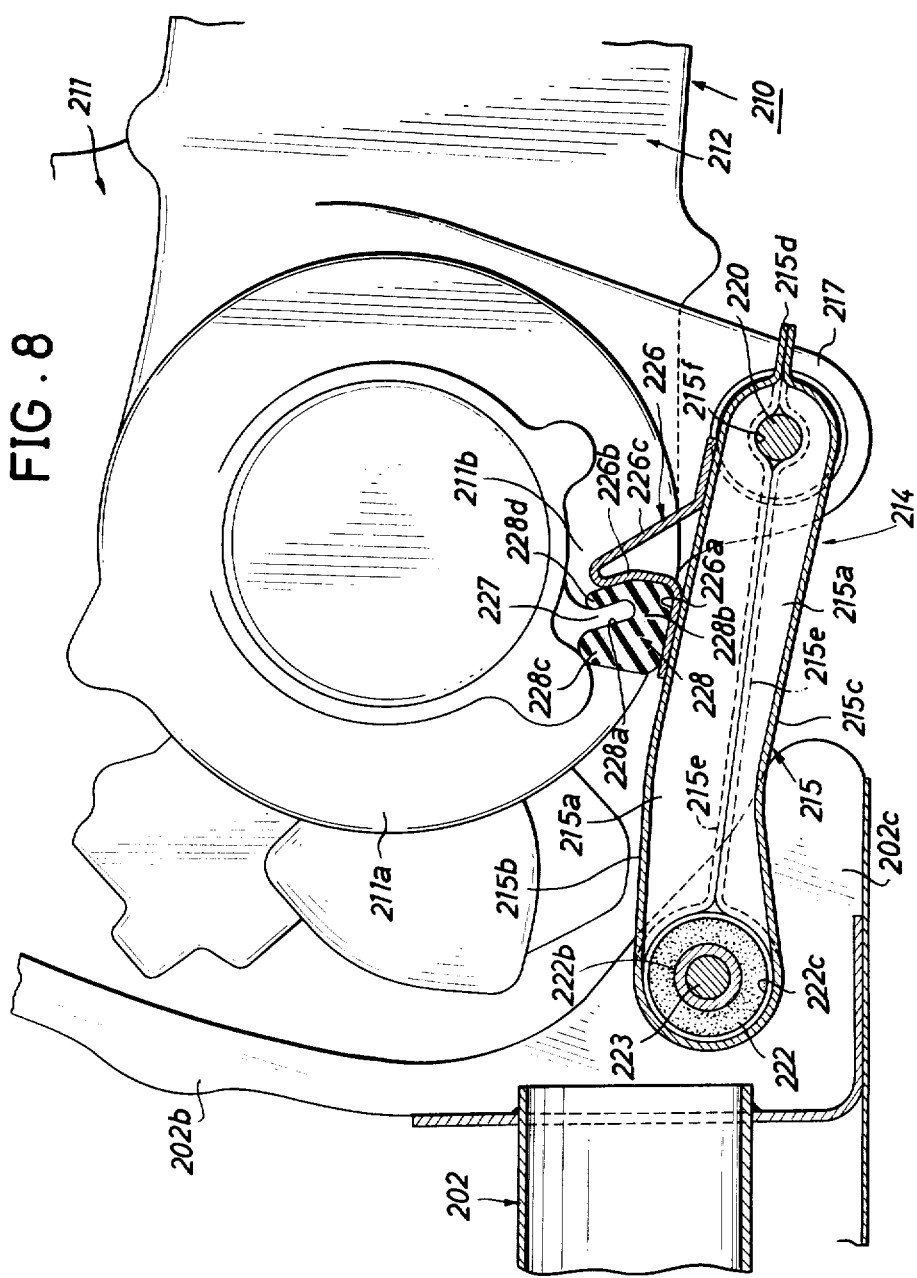
FIG. 8 is a side view of a suspension system according to a third embodiment of the invention, with an essential portion sectioned.
Figure 9:
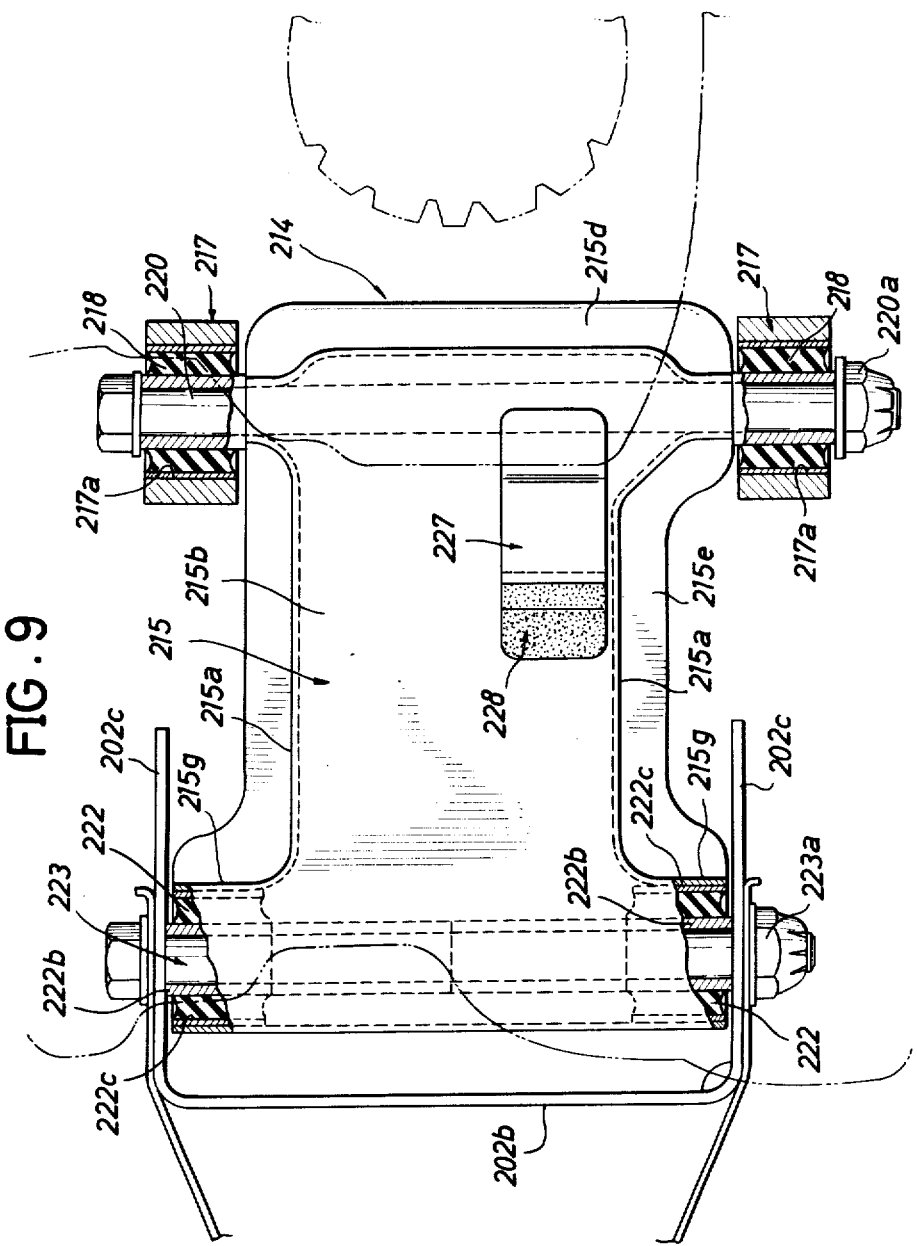
FIG. 9 is a plan view of the suspension system in FIG. 8, with an essential portion sectioned.
Figure 10:
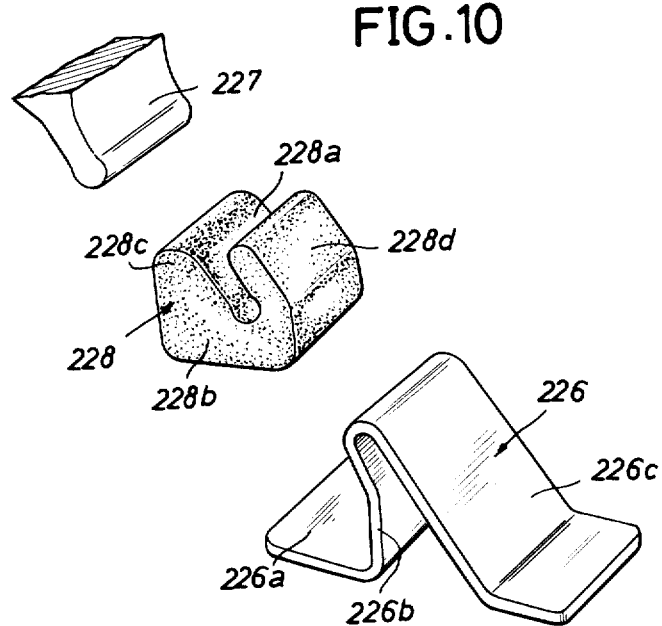
FIG. 10 is a perspective view of a disassembled elastic member portion according to the third embodiment.

FIGS. 8 to 10 show a third embodiment of the present invention.

The details of the link part of the third embodiment are shown in FIG. 9. In FIG. 9, designated generally at reference numeral 215 is a link including a link plate 214 defining a principal portion thereof. The link plate 214 is a press-molded steel plate folded around at its central portion into an upper plate 215b and a lower plate 215c vertically facing each other and having their rear edges 215d and 215d bent rearwardly and jointed with each other by welding or by other suitable means. The upper and lower plates 215b and 215c include at both sides thereof upper and lower side portions 215a and 215a bent downwardly and upwardly, respectively. At each side of the link plate, the upper and lower side portions 215a and 215a are opposed to each other and have their edges bent outwardly into respective flange portions 215e and 215e jointed with each other by welding or the like. A pair of bearing portions 215f and 215f which are coaxial on both lateral sides are formed with respective jointing surfaces of the side portions 215a at their rear ends. A bolt forming a rear horizontal shaft 220 is passed through two rubber bushes 218 and 218 which are provided for two projections 217 and 217 in the holes 217a and 217a thereof, the projections 217 and 217 projecting downwardly at either lateral side of a front lower portion of a power unit 210 or from the lower surface of a crank case 211a at the lower side of an engine 211 on the front side of a transmission case 212. The shaft 220 is thus passed through the bearing portions 215f and and a rear portion of the link plate 214 and fastened with a nut 220a from either side. Hence, the rear end of the link 215 and the lower portion of the power unit 210 are pivotally connected with each other.

Another pair of bearing portions 215g and 215g are formed on both lateral sides of the link plate 214 at respective front ends of the side portions 215a and 215a. An outer ring 222c of a rubber bush 222 is fitted in each of the bearing portions 215g by pressing or the like. A bolt forming a front horizontal shaft 223 is passed through and fitted in both inner rings 222b and 222b of the laterally spaced apart rubber bushes 222 and 222. The horizontal shaft 223 is laterally mounted between laterally spaced apart lower parts 202c and 202c of a rear portion 202b of a frame 202 and fastened with a nut 223a to the frame 202. Thus, the front end of the link 215 is pivotally connected to the vehicle frame 202. The rubber bush 222 around the front horizontal shaft is preloaded as already described.

A rubber member 228 or an elastic means is interposed between the link plate 214 and the front lower portion of the power unit 210, as shown in FIG. 10.

The rubber member 228 is substantially cubical in overall shape and an inclined narrow locking groove 228a open upwardly on both sides is formed in the rear part of the rubber member 228. The rubber member 228 has its front and rear stopper parts 228c and 228d partially separated from each other by the locking groove 228a and connected through a connecting part 228b below the locking groove 228a. The front stopper part 228c and the connecting part 228b are substantially thick. The rear stopper part 228d is thinner and more yieldable than the front stopper part 228b. The respective parts are all integrally molded. An inclined locking projecting piece 227 substantially equal to the locking groove 228a in the dimensions in the lateral direction and thicker than the front to rear clearance of the locking groove 228a is integrally projected from the lower surface of the crank case 211a, which may be an aluminum alloy casting, on the front side of the power unit 210.

The rubber member 228 is engaged by a light force with the projecting piece 227 in the locking groove 228a from the open side and regulated at its inner side by an outer wall 211b of a lower part of the crank case 211a on the inner side of the projection 227, thus being fitted to the lower surface of the crank case 211a. For this engagement, the crank case 211a may be pushed down or the link 215 may be pushed up about the front supporting shaft 223 as a fulcrum before applying the rear supporting shaft 220, to thus interpose the rubber member 228 in the compressing direction between the upper plate 215b of the link 215 and the front lower portion of the power unit 210, thereby giving it a preload. A stopper stay 226 is provided on the upper plate 215b of the link 215, in the form of a substantially inverted L-shaped steel plate secured by welding or the like to the plate 215b. The stay 226 consists of a flat receiving part 226a secured on the upper plate 215b, a stopper part 226b rising upwardly, and a supporting part 226c extending diagonally downwardly and rearwardly from the stopper part 226b and secured to plate 215b. The respective parts are all integrally molded. The connecting part 228b of the rubber member 228 is supported by the receiving part 226a. Respective rear surfaces of the connecting part 228b and the rear stopper part 228d of the rubber member 228 are supported by the stopper part 226b. The stopper part 226b of the stay 226 is preferably provided as near as possible to the root part of the projecting piece 227 for holding the projecting piece 227 and the rear stopper part 228d of the rubber member 228.

The vibration of the engine is comfortably absorbed and damped by the rubber member 228, with the preload in the compressing direction given to both the front stopper part 228c and the connecting part 228b of the rubber member 228 so that the engine vibration acting in the compressing direction of the rubber member 228 may be effectively absorbed in those parts. Upward and rearward motions of the power unit 210 are reduced by the rear stopper part 228d and can be cushioned in both directions of compression and extension by the single rubber member 228.

Even when the rear stopper part 228d of the rubber member 228 is broken, the projecting piece 227 and the stopper part 226b of the stopper stay 226 will contact with each other to issue a hitting sound so that the driver can immediately sense an abnormality. In case the entire rubber member 228 drops out, in addition to the above, the lower part of the crank case 211a and the upper end of the stopper stay 226 would contact with each other to issue a hitting sound so that the failure could also be immediately sensed. When an overload acts on the power unit 210, the projecting piece 227 can contact the stopper part 226b or such of the stay 226, and should the load be so high as to break 227 the projecting piece which could break. Therefore, before the engine case 211a breaks, the projecting piece 227 can break and the engine 211 and crank case 211a is effectively protected, thus assuring safety.

Because the link plate 214 is a box-shaped close section structure formed of a press-molded steel plate material, a sufficient strength and rigidity can be retained as well as the light weight. Further, because the bearing portions 215f and 215g are integrally molded, the shaft supporting structure can be simplified, the manufacture can be made easy, and the cost can be reduced.

The manufacture of the link 215 is as shown in FIGS. 11 to 14.

Figure 11:
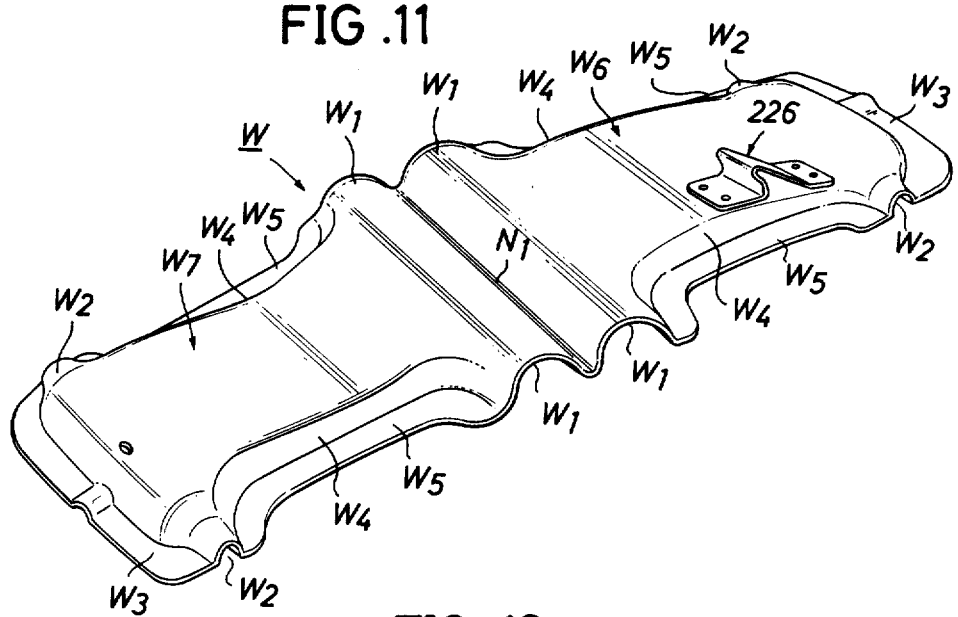
FIG. 11 is a developed perspective view of a link obtained by pressing a steel plate material, according to the third embodiment.
Figure 12:
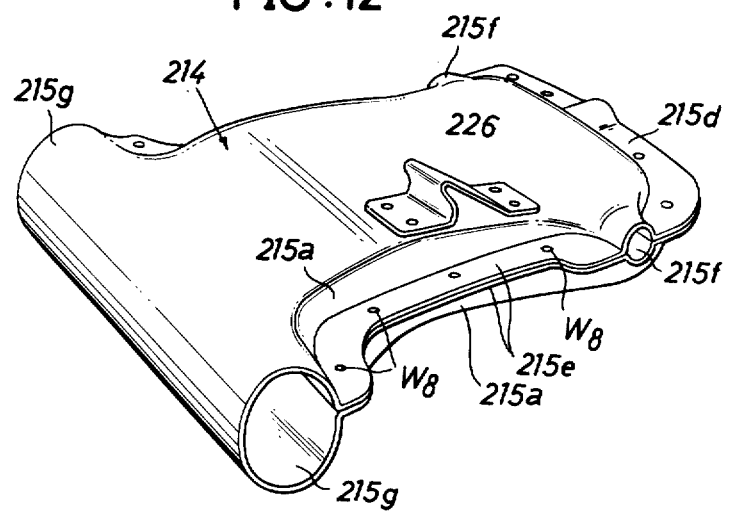
FIG. 12 is a perspective view of the link in FIG. 11 as folded and jointed.
Figure 13:
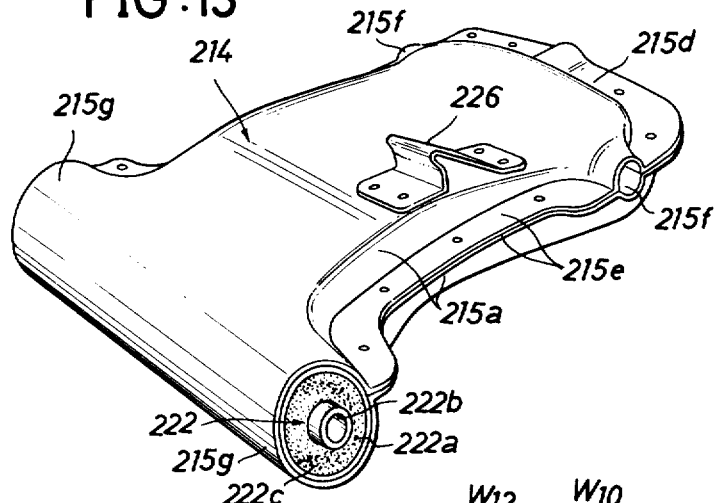
FIG. 13 is a perspective view of the link in FIG. 12 fitted with rubber bushes.

FIGS. 11 to 13 depict an embodiment wherein the link plate 214 is made of a press-molded steel plate material. A thin steel plate is punched to obtain a flat developed shape to be squeezed, bent and molded into a developed material W shown in FIG. 11.

The developed material W is substantially rectangular in the plan and has semicircular parts $W_1$ and $W_1$ of a large diameter formed in the front and rear of a center $N_1$ of the material W in its lengthwise direction thereof so that the semicircular parts $W_1$ and $W_1$ are symmetrical with respect to the center $N_1$ and adjacent to each other in the lengthwise direction. Another set of outer semicircular parts $W_2$ and $W_2$ of a small diameter are formed at symmetrical positions with respect to the center $N_1$. A pair of outwardly bent symmetrical jointing flanges $W_3$ and $W_3$ are formed at either of front and rear edges of the material W, and continuously between both respective sides of the small semicircular parts $W_2$ and $W_2$. A pair of widthwise intermediate front and rear portions $W_7$ and $W_6$ respectively extending between the large semicircular parts $W_1$ and the small semicircular parts $W_2$ are swollen out in the same direction as these semicircular parts. At either widthwise side of the material W, there are formed a pair of downwardly bent side portions $W_4$ and $W_4$ on either side of the center $N_1$, extending respectively between the large and small semicircular parts $W_1$ and $W_2$. These side portions $W_4$ and $W_4$ have their outwardly flanged edges $W_5$ and $W_5$ symmetrical with respect to the center $N_1$. The respective parts are all integrally formed. When folded into the link plate 214, the rear portion $W_6$ defines the upper plate 215b and the rear portion $W_7$ defines the lower plate 215c. Before this folding, the inverted L-shaped stopper stay 226 is welded and secured to the rear portion $W_6$ at a position suitably one-sided in both widthwise and lengthwise directions of the material W.

The material W is folded inwardly with respect to the center $N_1$. Thereby the front and rear flanged edges $W_5$ and $W_5$ formed in respective side portions $W_4$ and $W_4$ are placed on each other as are the front and rear flanges $W_3$ and $W_3$. These flanged edges $W_5$ and $W_5$ placed on each other are jointed by spot-welding at a plurality of points $W_8$ to obtain the link plate 214 shown in FIG. 12.

In the plate 214, by jointing the front and rear large diameter semicircular parts $W_1$ and $W_1$ of the material W, a pair of equidiametrical circular holes or the bearing portions 215g and 215g are formed at both lateral sides of the front end of the plate 214 and, by jointing the front and rear small diameter semicircular parts $W_2$ and $W_2$ of the material W, another pair of equidiametrical circular holes or the bearing portions 215f and 215f are formed at both lateral sides of the rear end of the plate 214. The respective bearing portions 215g and 215f are formed flush with respective sidewardly projecting lengths of the flange portions 215e. The front part of the link 215 is continuously curved and the flange portions 215e outwardly provided on both lateral sides may have a substantially equal lateral length along their longitudinal lengths.

The plate 214 is continuous or integrally jointed on its four sides, forms a box-shaped close section structure, and therefore has a preferable strength and rigidity. Particularly, a high torsional rigidity is obtained with the side portions 215a and flange portions 215e, thus resulting in a smaller thickness of material W which permits easier molding and reduced weight. Further, because of the spot-welding applicable to the flange portions 215e, the welding process can be considerably simplified.

As shown in FIG. 13, the rubber bush 22 with the rubber portion 222a baked between the inner and outer rings 222b and 222c is pressed and fixed into either of the bearing portions 215g at both lateral sides of the front end of the link plate 214 through the outer ring 222c.

Figure 14:
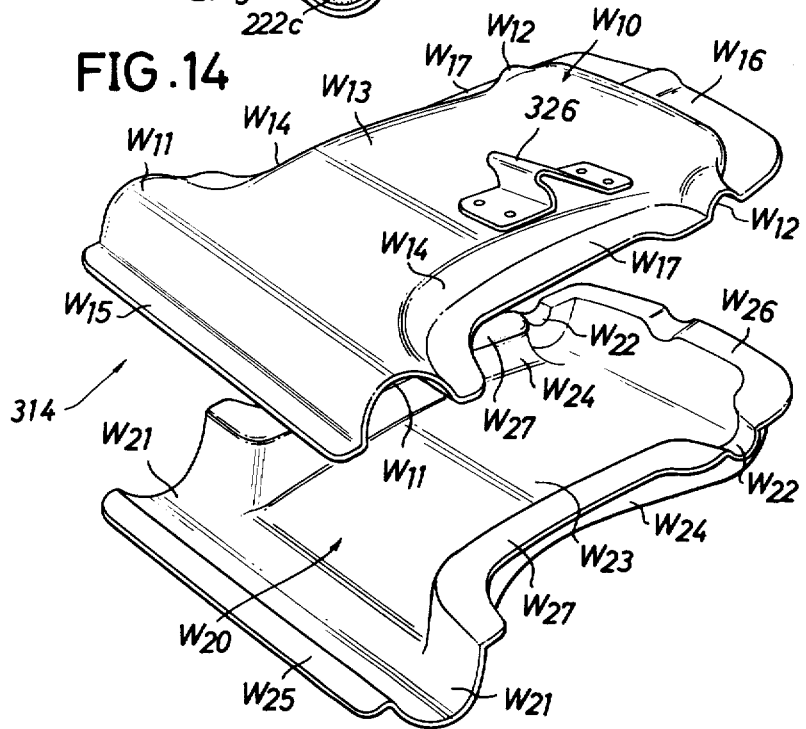
FIG. 14 is a perspective view of a link according to a fourth embodiment of the invention.

FIG. 14 shows a link plate 314 as disassembled, according to a fourth embodiment of the invention. The link plate 314 consists of an upper-half material $W_{10}$ and a lower-half material $W_{20}$ such as a press-molded steel plate. The materials $W_{10}$ and $W_{20}$ have their front semicircular portions $W_{11}$ and $W_{21}$ of a large diameter opposed to and symmetrical with each other and laterally extended between respective both sides of the material $W_{10}$ and $W_{20}$, their outwardly swollen dent portions $W_{13}$ and $W_{23}$ extended over respective substantial areas of the materials $W_{10}$ and $W_{20}$, and both of their respective vertical side portions $W_{13}$, $W_{13}$ and $W_{24}$, $W_{24}$ inwardly bent from the portions $W_{13}$ and $W_{23}$ respectively and symmetrical with each other. They further have their front edges $W_{15}$ and $W_{25}$ flanged forwardly to be symmetrical with each other, their rear edges $W_{16}$ and $W_{26}$ flanged rearwardly to be symmetrical with each other, and their respective side edges $W_{17}$, $W_{17}$ and $W_{27}$, $W_{27}$ flanged laterally outwardly to be symmetrical with each other. They have their respective rear lateral semicircular portions $W_{12}$, $W_{12}$ and $W_{22}$, $W_{22}$ of a small diameter formed at respective both sides of the portions $W_{13}$ and $W_{23}$ and symmetrical with and opposed to each other. A stopper stay 326 such as the stay 226 described hereinabove may be provided on the upperhalf material $W_{10}$ at a suitably one-sided position thereof. All respective pairs of the symmetrically flanged edges $W_{15}$, $W_{25}$; $W_{16}$, $W_{26}$; $W_{17}$, $W_{27}$; and $W_{17}$, $W_{27}$ are jointed with each other by suitable means such as spot-welding, to thus obtain the link plate 314 of a box-shaped close section when assembled.

In the detailed description hereinabove, the box-shaped close section link is provided for the embodiments of FIGS. 8 and 14, however, this type of link may be used in the embodiments of FIGS. 2 and 5. It will be easily understood that the links of such embodiments can be manufactured with only certain design modifications in each such case.

We claim:

1. In a motorcycle having a vehicle body frame and a power unit including an engine assembled integrally with a transmission and supporting an axle of a rear wheel, a suspension system for said power unit comprising:

link means having an axis in its longitudinal direction extending substantially at right angles to the direction of principal vibratory forces of said engine;

said link means being rotatable about a first pivot means while resiliently resisted, and about a second pivot means spaced apart in said longitudinal direction from said first pivot means;

said first pivot means being secured to said frame and said second pivot means being secured to a first front lower portion of said power unit;

whereby the entire rotational load acting on said power unit about said axle of said rear wheel is substantially converted into a moment of rotation of said link means;

first elastic means provided for said link means to elastically support said power unit, said first elastic means being arranged between an upper portion of said link means and a second front lower portion of said power unit;

said first elastic means being capable of producing a reaction force opposing said rotational load; and means for supporting a rear portion of said power unit from an upper portion of said frame, said supporting means including shock absorbing means.

2. A suspension system according to claim 1, wherein:

second elastic means for cushioning an upward movement of said power unit (110) is arranged under said upper portion (115) of said link means (115) and connected to said first elastic means by a first stay member provided through said link means.

3. A suspension system according to claim 1, wherein:

said first elastic means comprises a compressed spring member.

4. A suspension system according to claim 1, wherein:

said first elastic means comprises a first rubber member.

5. A suspension system according to claim 2 or 4, wherein:

said second elastic means comprises a second rubber member;

said first elastic means and said second rubber member have ring-like bodies surrounding said first stay member; and a support member for holding said first elastic means is secured to said first stay member and to said second front lower portion of said power unit.

6. A suspension system according to claim 4, wherein:

said first rubber member has on its upper side a locking groove engaged with a locking member secured to said second front lower portion of said power unit.

7. A suspension system according to claim 6, wherein:

said first rubber member has its rear portion held by a second stay member.

8. A suspension system according to claim 7, wherein:

said first rubber member is preloaded in the direction of said rotational load.

9. A suspension system according to claim 8, wherein:

said second stay member is secured to said link means;

said rear portion of said first rubber member is interposed between said locking member and said second stay member; and said second rubber member has its front portion disposed in front of said locking member and its intermediate portion (228b) disposed under said locking member.

10. A suspension system according to claim 1, 2, 3, 4, 6, 7, 8 or 9, wherein:

at least one third elastic means is provided between said link means and said first pivot means; and said third elastic means is secured on one side thereof to said link means and on another side thereof to said first pivot means.

11. A suspension system according to claim 10, wherein:

said third elastic means is preloaded in a circumferential direction such that a reaction force opposing to said moment of rotation of said link means is developed in said third elastic means.

12. A suspension system according to claim 1, 2, 3, 4, 6, 7, 8, or 9, wherein:

said link means comprises a substantially box-shaped structure member having its section substantially enclosed.

13. A suspension system according to claim 12, wherein:

said structure member integrally includes front and rear support portions for supporting either of said first pivot means and said second pivot means.

14. A suspension system according to claim 13, wherein:

said structure member is formed of a single steel plate member.

15. A suspension system according to claim 14, wherein:

said plate member is formed with an upper plate portion and a lower plate portion;

said upper plate portion and said lower plate portion have on both sides thereof front semi-circular portions formed symmetrical with each other, rear semicircular portions formed symmetrical with each other, and side portions bent towards each other and including respective edges flanged outwardly symmetrically with each other; and said front portions support said first pivot means and said rear portions support said second pivot means.

16. A suspension system according to claim 13, wherein:

said structure member is formed of an upper press-molded steel plate member and a lower press-molded steel plate member;

said upper plate member and said lower plate member have on both sides thereof front semicircular portions formed symmetrical with each other, rear semicircular portions formed symmetrical with each other, and side portions bent towards each other and including respective edges flanged outwardly symmetrically with each other; and said front portions support said first pivot means (123, 223) and said rear portions support said second pivot means.

17. A suspension system according to claim 1, 2, 3, 4, 6, 7, 8, or 9, wherein:

said link means has a substantial width which is sufficient to protect a lower portion of said engine.

18. A suspension system according to claim 1, 2, 3, 4, 6, 7, 8 or 9, wherein:

said first elastic means is arranged substantially near a center of gravity of said engine.

* * * * *